United States Patent [19]

Okumura et al.

[11] Patent Number: 5,580,374
[45] Date of Patent: Dec. 3, 1996

[54] AQUEOUS INK COMPOSITION FOR BALL POINT PEN

[75] Inventors: Shigeru Okumura; Shigeru Miyazaki, both of Yokohama, Japan

[73] Assignee: Mitsubishi Pencil Kabushiki Kaisha, Tokyo, Japan

[21] Appl. No.: 503,499

[22] Filed: Jul. 18, 1995

[30] Foreign Application Priority Data

Jul. 26, 1994 [JP] Japan .................................. 6-174441
Jun. 29, 1995 [JP] Japan .................................. 7-163649

[51] Int. Cl.$^6$ .................................................. C09D 11/02
[52] U.S. Cl. ......................................... 106/22 H; 106/20 R
[58] Field of Search ............................... 106/20 R, 22 H, 106/23 H

[56] References Cited

U.S. PATENT DOCUMENTS 5,169,436  12/1992  Matrick ................................ 106/22 A

FOREIGN PATENT DOCUMENTS 62-58394  12/1987  Japan .

OTHER PUBLICATIONS

Chemical Abstracts, vol. 111, No. 12, 18 Sep. 1989, Columbus, Ohio.
Chemical Abstracts, vol. 110, No. 6, 6 Feb. 1989, Columbus, Ohio.
Patent Abstracts of Japan, vol. 8, No. 41, 22 Feb. 1984.

*Primary Examiner*—Helene Klemanski
*Attorney, Agent, or Firm*—Darby & Darby, P.C.

[57] ABSTRACT

An aqueous ink composition for ball point pens is disclosed herein which comprises 2,5-dimercapto-1,3,4-thiadiazole or its salt, a colorant, water and a water-soluble organic solvent.

The aqueous ink composition for ball point pens of the present invention is excellent in lubricating properties, can control ball sinkage, and can give a smooth writing feeling.

8 Claims, No Drawings

AQUEOUS INK COMPOSITION FOR BALL POINT PEN

BACKGROUND OF THE INVENTION (i) Field of the Invention

The present invention relates to an aqueous ink composition for ball point pens.

(ii) Description of the Related Art

In an aqueous ink composition for ball point pens, a water-soluble high-boiling organic solvent such as a polyvalent alcohol, for example, glycol or glycerin has been used as a dry inhibitor in addition to water. When the aqueous ink containing such an organic solvent is used for writing, frictional resistance between a tip ball and a ball holder in a pen point increases by the rotation of the ball. In consequence, at the time of the writing, a ball receiver is noticeably worn, so that a writing performance deteriorates and the flow of the ink through the pen point becomes inconveniently nonuniform owing to the deterioration of the tip. For the purpose of overcoming such a drawback, it has been attempted to add a lubricity improver. Japanese Patent Publication No. (Sho) 62-58394 has disclosed an ink to which an unsaturated fatty acid or a water-soluble cutting agent is added as a lubricant.

However, even if the above-mentioned ink additive is added to the ink in accordance with the conventional technique, the lubricating properties are not sufficient, and an unwritable phenomenon occurs owing to the wear of the ball receiver. Even though the sufficient lubricating properties can be obtained, there is a practical problem that the surface tension of the ink noticeably deteriorates, with the result that the feathering of written lines tends to occur.

SUMMARY OF THE INVENTION

The present invention has been intended to solve the above-mentioned problems, and an object of the present invention is to provide an aqueous ink for ball point pens which is excellent in lubricating properties and nondrying properties and which permits a smooth ball rotation to decrease the wear of a tip holder receiver and gives a smooth writing performance.

The present inventors have intensively investigated to solve the above-mentioned problems, and as a result, it has been found that when 2,5-dimercapto-1,3,4-thiadiazole or its salt is added to an aqueous ink, the above-mentioned object can be achieved. In consequence, the present invention has been completed on the basis of this knowledge.

That is to say, an aqueous ink composition for ball point pens of the present invention is characterized by comprising 2,5-dimercapto-1,3,4-thiadiazole or its salt, a colorant, water and a water-soluble organic solvent.

Preferably, the present invention is directed to an aqueous ink composition for ball point pens which comprises 0.01 to 10% by weight of 2,5-dimercapto-1,3,4-thiadiazole or its salt, 0.05 to 30% by weigh colorant, 40 to 90% by weight of water and 40% by weight or less of a water-soluble organic solvent with respect to the total amount of the composition.

In the case that a pigment is used as the colorant, the present invention is directed to an aqueous ink composition for ball point pens which comprises 2,5-dimercapto-1,3,4-thiadiazole or its salt, a pigment, a dispersant, water and a water-soluble organic solvent.

Preferably, the present invention is directed to an aqueous ink composition for ball point pens which comprises 0.01 to 10% by weight of 2,5-dimercapto-1,3,4-thiadiazole or its salt, 2 to 30% by weight of a pigment, 0.1 to 10% by weight of a dispersant, 40 to 90% by weight of water and 40% by weight or less of a water-soluble organic solvent with respect to the total amount of the composition.

The dispersant is preferably a water-soluble polymer.

In the case that a dye is used as the colorant, the present invention is directed to an ink composition for aqueous ball point pens which comprises 0.01 to 10% by weight of 2,5-dimercapto-1,3,4-thiadiazole or its salt, 0.05 to 30% by weight of a dye, 40 to 90% by weight of water and 40% by weight or less of a water-soluble organic solvent.

DETAILED DESCRIPTION OF THE PREFERRED EMBODIMENTS 2,5-dimercapto-1,3,4-thiadiazole (Formula 1) or its salt (Formula 2) which can be used in an ink composition of the present invention are compounds represented by the formulae

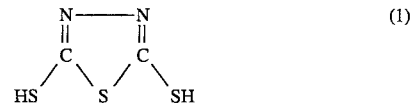 (1)

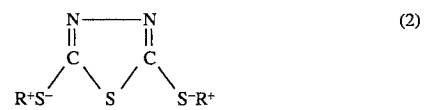 (2)

wherein R is $NH_4$, an organic amine or an alkali metal.

The content of 2,5-dimercapto-1,3,4-thiadiazole or its salt in the ink composition is in the range of 0.01 to 10% by weight, preferably 0.1 to 5% by weight. If the content of 2,5-dimercapto-1,3,4-thiadiazole or its salt is less than 0.01% by weight, sufficient lubricating properties cannot be obtained, so that the improvement of a writing performance cannot be expected. If it is more than 10% by weight, the precipitation phenomenon of the ink composition occurs with time, and in the case of the ink which is used in a type of a ball point pen for storing the ink in an ink absorber comprising a sponge-like material or fiber (hereinafter referred to as "the ink absorber type pen") or another a type of a ball point pen for directly storing the ink in an ink tank (hereinafter referred to as "the direct storage-type pen"), the viscosity of the ink rises, which unsuitably impedes the flow of the ink through a pen point at the time of writing.

In the ink composition of the present invention, water is used as a solvent, but a water-soluble organic solvent may be used in addition thereto.

Examples of the solvent include alkylene glycols such as ethylene glycol, diethylene glycol, triethylene glycol, tetraethylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl1,3-butanediol, 2-methylpentane-2,4-diol, 3-methylpenane1,5-diol, 1,2,3-butanetriol, 1,2,4-butanetriol, 3-methylpentane-1,3,5-triol, 1,2,3-hexanetriol, and the like, polyalkylene glycols such as polyethylene glycol, polypropylene glycol and the like, glycerols such as glycerol, diglycerol, triglycerol and the like, lower alkyl ethers of glycols such as ethylene glycol monomethyl ether, ethylene glycol monoethyl ether, diethylene glycol monomethyl ether, diethylene glycol monoethyl ether, diethylene glycol mono-n-butyl ether and the like, thiodiethanol, N-methyl-2-pyrrolidone, 1,3-dimethyl-2-imidazolidinone, sulfolane and the like.

The content of the solvent is usually 40% by weight or less, and preferably, it is selected in the range of 5 to 40% by weight with respect to the total weight of the composition. If the content of the solvent is in excess of 40% by weight, the strike-through of the ink occurs when writing is made on the paper, and drying is unpreferably difficult. The solvent can improve the nondrying properties of the ink.

Colorants which can be used in the ink composition of the present invention are a pigment and a water-soluble dye.

No particular restriction is put on the kind of pigment, and from inorganic and organic pigments which have usually been used in conventional aqueous ink compositions, a desirable pigment can be selected and used. In addition, inorganic fluorescent and organic fluorescent pigments can also be used.

Examples of the inorganic pigments include titanium oxide, carbon black, red iron oxide, chromium oxide, iron black, cobalt blue, alumina white, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium, barite powder, calcium carbonate, white lead, prussian blue, manganese violet, aluminum powder, stainless steel powder, nickel power, copper powder, zinc powder and the like.

Examples of the organic pigments include azo lakes, insoluble azo pigments, chelate azo pigments, phthalocyanine pigments, perylene and perinone pigments, anthraquinone pigments, quinacridone pigments, dye lakes, nitro pigments, nitroso pigments and the like. Typical examples of the usable organic pigments include Phthalocyanine Blue (C.I. 74160), Phthalocyanine Green (C.I. 74260), Hansa Yellow 3G (C.I. 11670), Disazo Yellow GR (C.I. 21100), Permanent Red 4R (C.I. 12335), Brilliant Carmine 6B (C.I. 15850) and Quinacridone Red (C.I. 46500).

The inorganic fluorescent pigment is a pigment which can be obtained by adding an activator such as copper, silver or manganese to a heavy metal salt of zinc sulfide or the like, or a sulfide of an alkaline earth metal having a high purity, and then calcining the mixture at a high temperature.

The organic fluorescent pigment is a solid solution in which a fluorescent dye is dissolved in a vehicle of a synthetic resin. Examples of the synthetic resin include a vinyl chloride resin, an alkyd resin and, alkali resin and the like, and examples of the fluorescent dye include C.I. Acid Yellow 7, C.I. Basic Red 1 and the like.

These pigments can be used singly or in a combination of two or more thereof. The content of the pigment is usually selected in the range of 2 to 30% by weight, preferably 5 to 15% by weight based on the total weight of the composition.

Examples of the usable water-soluble dye include direct dyes, acid dyes, food dyes and basic dyes. In addition, fluorescent dyes can also be used to obtain sharp hues.

Examples of the direct dyes include C.I. Direct Black 17, C.I. Direct Black 19, C.I. Direct Black 22, C.I. Direct Black 32, C.I. Direct Black 38, C.I. Direct Black 51, C.I. Direct Black 71, C.I. Direct Yellow 4, C.I. Direct Yellow 26, C.I. Direct Yellow 44, C.I. Direct Yellow 50, C.I. Direct Red 1, C.I. Direct Red 4, C.I. Direct Red 23, C.I. Direct Red 31, C.I. Direct Red 37, C.I. Direct Red 39, C.I. Direct Red 75, C.I. Direct Red 80, C.I. Direct Red 81, C.I. Direct Red 83, C.I. Direct Red 225, C.I. Direct Red 226, C.I. Direct Red 227, C.I. Direct Blue 1, C.I. Direct Blue 15, C.I. Direct Blue 71, C.I. Direct Blue 86, C.I. Direct Blue 106, C.I. Direct Blue 119 and the like.

Examples of the acid dyes include C.I. Acid Black 1, C.I. Acid Black 2, C.I. Acid Black 24, C.I. Acid Black 26, C.I. Acid Black 31, C.I. Acid Black 52, C.I. Acid Black 107, C.I. Acid Black 109, C.I. Acid Black 110, C.I. Acid Black 119, C.I. Acid Black 154, C.I. Acid Yellow 7, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 42, C.I. Acid Yellow 49, C.I. Acid Yellow 61, C.I. Acid Yellow 72, C.I. Acid Yellow 78, C.I. Acid Yellow 110, C.I. Acid Yellow 141, C.I. Acid Yellow 127, C.I. Acid Yellow 135, C.I. Acid Yellow 142, C.I. Acid Red 8, C.I. Acid Red 9, C.I. Acid Red 14, C.I. Acid Red 18, C.I. Acid Red 26, C.I. Acid Red 27, C.I. Acid Red 35, C.I. Acid Red 37, C.I. Acid Red 51, C.I. Acid Red 52, C.I. Acid Red 57, C.I. Acid Red 82, C.I. Acid Red 87, C.I. Acid Red 92, C.I. Acid Red 94, C.I. Acid Red 111, C.I. Acid Red 129, C.I. Acid Red 131, C.I. Acid Red 138, C.I. Acid Red 186, C.I. Acid Red 249, C.I. Acid Red 254, C.I. Acid Red 265, C.I. Acid Red 276, C.I. Acid Violet 15, C.I. Acid Violet 17, C.I. Acid Blue 1, C.I. Acid Blue 7, C.I. Acid Blue 9, C.I. Acid Blue 15, C.I. Acid Blue 22, C.I. Acid Blue 23, C.I. Acid Blue 25, C.I. Acid Blue 40, C.I. Acid Blue 41, C.I. Acid Blue 43, C.I. Acid Blue 62, C.I. Acid Blue 78, C.I. Acid Blue 83, C.I. Acid Blue 90, C.I. Acid Blue 93, C.I. Acid Blue 103, C.I. Acid Blue 112, C.I. Acid Blue 113, C.I. Acid Blue 158, C.I. Acid Green 3, C.I. Acid Green 9, C.I. Acid Green 16, C.I. Acid Green 25, C.I. Acid Green 27 and the like.

Most of the food dyes are covered in the direct dyes and the acid dyes, but one example of the food dyes which are not covered therein is C.I. Food Yellow 3.

Examples of the basic dyes include C.I. Basic Yellow 1, C.I. Basic Yellow 2, C.I. Basic Yellow 21, C.I. Basic Orange 2, C.I. Basic Orange 14, C.I. Basic Orange 32, C.I. Basic Red 1, C.I. Basic Red 2, C.I. Basic Red 9, C.I. Basic Red 14, C.I. Basic Violet 1, C.I. Basic Violet 3, C.I. Basic Violet 7, C.I. Basic Green 4, C.I. Basic Brown 12, C.I. Basic Black 2, C.I. Basic Black 8 and the like.

These dyes may be used singly or in a combination of two or more thereof. The content of the dye is usually in the range of 0.05 to 30% by weight, preferably 1 to 15% by weight with respect to the total weight of the composition.

If the composition containing more than 30% by weight of the colorant is stored for a long period of time, the pigment coheres or the dye precipitates, so that a pen point clogs and a writing failure takes place. If the content of the colorant is less than 0.05% by weight, a colored state is so weak that a hue cannot be inconveniently recognized.

When the pigment is used as the colorant, a dispersant is necessary. The dispersant adheres to the surfaces of pigment particles to disperse the pigment in water. As the dispersant, there can be used nonionic and anionic surface active agents as well as water-soluble polymers. Above all, the water-soluble polymers are preferable.

Examples of the nonionic surface active agents include polyoxyalkylene higher fatty acid esters, partial esters of higher fatty acids and polyvalent alcohols, higher fatty acid esters of saccharoses and the like. Typical examples of the nonionic surface active agents include fatty acid esters of glycerin, polyglycerin fatty acid esters, propylene glycol fatty acid esters, pentaerythritol fatty acid esters, polyoxyethylene sorbitan fatty acid esters, polyoxyethylene sorbitol fatty acid esters, polyoxyethylene glycerin fatty acid esters, polyethylene glycol fatty acid esters, polyoxyethylene alkyl ethers, polyoxyethylene phytosterol, polyoxyethylenepolyoxypropylene alkyl ethers, polyoxyethylene alkylphenyl ethers, polyoxyethylene caster oil, polyoxyethylene lanolin, polyoxyethylene lanolin alcohols, polyoxyethylenealkylamines, polyoxyethylene fatty acid amides, polyoxyethylene alkylphenylformaldehyde condensates and the like.

Examples of the anionic surface active agents include alkylated sulfonates, alkylallyl sulfonates of higher fatty acid amides and the like. Typical examples of the anionic surface active agents include alkyl sulfates, polyoxyethylene alkyl ether sulfates, N-acylamino acid salts, N-acylmethyltaurine salts, polyoxyethylene alkyl ether acetates, alkyl phosphates, polyoxyethylene alkyl ether phosphates and the like.

Examples of the water-soluble polymers include anionic polymers such as polyacrylates, salts of styrene-acrylic acid copolymers, salts of styrene-maleic acid copolymers, salts of vinylnaphthalene-maleic acid copolymers, β-naphthalenesulfonic acid formalin condensates and the like, and nonionic polymers such as polyvinyl alcohol, polyvinyl pyrrolidone, polyethylene glycol and the like. Typical examples of alkali metals which can be used to form these salts include sodium and potassium, and typical examples of amines include aliphatic primary to tertiary amines such as mono-, di- and trimethylamines, alcoholamines such as mono-, di- and tripropanolamines, methylethanolamine, methylpropanolamine and dimethylethanolamine, ammonia, morpholine, N-methylpholine and the like.

The content of the dispersant is in the range of 0.1 to 10% by weight based on the weight of the ink composition.

No particular restriction is put on water which can be used in the ink composition of the present invention, but water purified by ion exchange or the like is preferable. The content of water is suitably in the range of 40 to 90% by weight based on the weight of the ink composition.

In addition to the above-mentioned materials, if necessary, some additives may be further added to the ink composition of the present invention, and examples of the additives include a lubricant, an antiseptic, a rust preventive, a pH adjustor, a dry inhibitor, a thickener and an emulsion.

Examples of the lubricant include salts of fatty acids such as potassium linoleate, sodium ricinoleate, potassium oleate, sodium oleate and the like.

Examples of the antiseptic include phenol, isopropylmethylphenol, pentachlorophenolsodium, benzoic acid, sodium benzoate, dehydroacetic acid, sodium dehydroacetate, sorbic acid, potassium sorbate, sodium salt of 2-pyridinethiol-1-oxide, 1,2-benzisothiazoline-3-one, 5-chloro-2-methyl-4-isothiazoline-3-one, 2,4-thiazolylbenzimidazole, paraoxybenzoic acid ester and the like.

Examples of the rust preventive include tolyltriazole, benztriazole and derivatives thereof, phosphorus derivatives of fatty acid such as octyl phosphate and dioctyl phosphate, imidazole, benzimidazole and derivatives thereof, 2-mercaptobenzothiazole, octyloxymethanesulfonic acid, dicyclohexylammonium.nitrite, diisopropylammonium.nitrite, propargyl alcohol, dialkylthioureas and the like.

Examples of the pH adjustor include inorganic alkalis such as sodium hydroxide, potassium hydroxide, calcium hydroxide, sodium carbonate, sodium hydrogencarbonate and ammonia, and organic amines such as methylamine, dimethylamine, trimethylamine, ethylamine, diethylamine, triethylamine, propylamine, dipropylamine, tripropylamine, butylamine, dibutylamine, tributylamine, isobutylamine, diisobutylamine, 2-butaneamine, N-(1-methylpropyl)-1-propaneamine, N,N-dimethylbutylamine, 1,2-dimethylpropylamine, N-ethyl-1,2-dimethylpropylamine, allylamine, diallylamine, triallylamine, N,N-dimethylallylamine, N-methyldiallylamine, 3-pentylamine, N,N-diisopropylethylamine, 2-(hydroxymethylamino)ethanol, 2-aminopropanol, 3-aminopropanol, triethanolamine, monoethanolamine, diethanolamine, 2-amino-2-methyl-1-propanol, N-isobutyldiethanolamine, 3-methoxypropylamine, 3-propyloxypropylamine, 3-isopropyloxypropylamine, 3-butoxypropylamine and the like. Each of these inorganic alkali and organic amines can form a salt represented by the formula (2) together with 2,5-dimercapto-1,3,4-thiadiazole.

Examples of the dry inhibitor include urea, thiourea, ethylene urea and derivatives thereof.

Examples of the thickener include natural water-soluble polymeric polysaccharides and synthetic polymers. Examples of the polysaccharides include gum arabic, tragacanth gum, locust bean gum, cyamoposis gum and derivatives thereof, agar, alginic acid, alginates, pectin, gelatin, casein, casein sodium, glucomannan, dextran, methyl cellulose, ethyl cellulose, hydroxyethyl cellulose, carboxymethyl cellulose, hydroxypropyl cellulose, sodium starch glycollate, lanolin derivatives, chitosan derivatives, lactalbumin and the like. An example of the polysaccharide obtained by the fermentation of microorganisms is xanthane gum. Examples of the synthetic polymers include polyethylene oxide, polyethylene glycol, polyvinyl alcohol, polyvinyl methyl ether, polyvinyl pyrrolidone and derivatives thereof, acrylic resin, urethane resin, polyacrylic resin and copolymers thereof, alkali salts of polyacrylic acid and polymethacrylic acid, alkali salts of copolymers containing acrylic acid and methacrylic acid, alkali salts of copolymers of styrene and maleic acid, alkali salts of copolymers of vinyl acetate and crotonic acid and the like.

The addition of the emulsion permits obtaining drawn lines without feathering and giving a comfortable writing feeling.

The content of the emulsion is preferably in the range of 1 to 15% by weight. Typical examples of the emulsion include polystyrene, polymethyl methacrylate, polyvinyl chloride, polyvinyl acetate, benzoguanamine resin, epoxy resin and the like.

In addition, examples of the usable emulsion include compounds obtained by copolymerizing α,β-ethylenic unsaturated acids (e.g., acrylic acid, methacrylic acid and maleic acid), acrylic acid esters and methacrylic acid esters (e.g., ethyl acrylate, propyl acrylate, butyl acrylate, methyl methacrylate, ethyl methacrylate, propyl methacrylate and butyl methacrylate) and aromatic vinyls (e.g., styrene and vinyltoluene).

The aqueous ink composition of the present invention can be classified into compositions having a viscosity of 1 to several mPa.S and compositions having a viscosity of 50 to 2000 mPa.S.

The ball point pens to which the aqueous ink composition of the present invention can be applied can be classified into ink absorber type ball point pens or direct storage type ball point pens, which have been defined hereinbefore.

The ink absorber type ball point pen is constituted of a shaft tube receiving an absorber impregnated with the aqueous ink having a viscosity of 1 to several mPa.S of the present invention, a connecting core comprising a fiber bundle which is connected to the absorber, a pen point comprising a ball and a tip holder, and the like.

The direct storage type ball point pens can be further classified into two types. One of these types is constituted of an ink tank directly storing the aqueous ink having a viscosity of 1 to several mPa.S of the present invention, an ink retainer for temporarily retaining the ink so as to prevent the ink from dropping through the pen point and an air orifice when the air in the ink tank is expanded by temperature rise to expand the ink from the ink tank, the pen point comprising the ball and the tip holder, and the like. Another direct storage type ball point pen is constituted of a tube directly storing the aqueous ink having a viscosity of 1 to several mPa.S of the present invention, the pen point comprising the ball and the tip holder, and the like.

The pen point of the aqueous ball point pen is constituted of the tip holder and the ball, and the tip holder is made of at least one material selected from the group consisting of stainless steel, brass and nickel silver and the ball is made of a super hard alloy, zirconia or silicon carbide.

According to the ball point pen in which the ink composition of the present invention is used, relatively thin lines can be drawn, and even if the ball point pen is used for a long period of time, the pen point scarcely wears, so that the width of written lines scarcely changes, in contrast to writing implements having the pen points made of a fiber and a resin.

The aqueous ink composition for ball point pens of the present invention, when used in the ball point pen, exerts excellent characteristics such as good lubricating properties, the prevention of the wear of the tip holder, a smooth writing feeling and the acquisition of lines without feathering.

The functional mechanism for improving the lubricating properties and a writing performance of the ink composition of the present invention has not been elucidated yet, but it can be presumed that 2,5-dimercapto-1,3,4-thiadiazole or its salt adsorbs to the surfaces of the ball and a ball receiver to form lubricating films thereon, so that the lubricating properties of the ink are improved to reduce the wear of the tip holder, with the result that the excellent writing performance and the smooth writing feeling can be obtained and lines having less feathering can be drawn.

EXAMPLES

Next, the present invention will be described in more detail with reference to examples, but the scope of the present invention should not be limited to these examples at all.

The evaluation of inks obtained in the respective examples and comparative examples was carried out in accordance with the judgment of the following writing test. The results are shown in Table 1.

The measurement procedure of a ball sinkage, and the judgment of a writing feeling and the feathering of a written line in the writing test were carried out as follows.

The writing test was made by the use of ink absorber type aqueous ball point pens in Examples 1,3 and 4 and Comparative Examples 1 and 3, by the use of direct storage type aqueous ball point pens having an ink retainer and an ink tank in Examples 2 and 5 and Comparative Examples 2 and 4, and by the use of direct storage type aqueous ball point pens having a polypropylene tube in which an ink was stored in Examples 6 and 7 and Comparative Examples 5 and 6.

With regard to tips of the ball point pens, in Examples 1 to 5 and 7 and Comparative Examples 1 to 4 and 6, a stainless steel tip was used, and in Example 6 and Comparative Example 5, a nickel silver tip was used. With regard to balls, a super hard alloy ball was used in all the examples and comparative examples.

Ball sinkage:

After writing was done as much as 500 m under conditions of a writing angle of 60°, a writing speed of 4.0 m/min and a load of 100 g by the use of a spiral writing test machine, a depth of a worn portion of a seat for the ball, i.e., a length of the reduced portion of the ball protruded from a holder was measured.

Writing feeling:
o: A smooth and stable writing feeling.
Δ: A rugged and hard writing feeling.
×: A rugged and hard writing feeling with line cut and directional property.

Feathering of written line:
o: A sharp line without feathering.
Δ: An obscure line with feathering.
×: A very obscure line with noticeable feathering.

The viscosity of the inks obtained in the examples and comparative examples was measured by the following procedure.

The measurement of the viscosity was carried out under conditions of 50 rpm by the use of a standard cone (an angle formed by a cone surface and a plate =1°34') of a cone and plate type viscometer (an ELD type viscometer and an EMD viscometer) made by Toki Sangyo Co., Ltd. In Examples 1 to 5 and Comparative Examples 1 to 4, the ELD type viscometer was used, and in Examples 6 and 7 and Comparative Examples 5 and 6, the EMD viscometer was used.

EXAMPLE 1

The following materials were stirred and mixed for 3 hours by a stirrer, and then dispersed for 5 hours by a sand mill. Afterward, coarse particles were removed from the mixture by a centrifugal separator to prepare a black aqueous pigment ink for ball point pens. The viscosity of the ink was 3.5 mPa.s.

| | |
|---|---|
| Carbon black | 8.0 (wt %) |
| (trade name "Carbon Black MA-100", made by MITSUBISHI KASEI CORPORATION) | |
| Glycerin | 20.0 |
| Ammonium salt of styrene-acrylic acid resin | 3.0 |
| Triethanolamine | 1.0 |
| 2,5-dimercapto-1,3,4-thiadiazole | 1.0 |
| Benztriazole | 0.1 |
| Phenol | 0.1 |
| Purified water | 66.8 |
| Total | 100.0 |

EXAMPLE 2

The following materials were treated by the same procedure as in Example 1, thereby preparing a blue aqueous pigment ink for ball point pens. The viscosity of the ink was 3.8 mPa.s.

| | |
|---|---|
| Phthalocyanine blue | 7.0 (wt %) |
| (trade name "Choromofine Blue 4965", made by DAINICHISEIKA COLOR & CHEMICALS MFG. CO., LTD.) | |
| Glycerin | 25.0 |
| Ammonium salt of styrene-maleic acid resin | 3.0 |
| Potassium oleate | 0.3 |
| Triethanolamine | 0.5 |
| 2,5-dimercapto-1,3,4-thiadiazole | 0.1 |
| Tolyltriazole | 0.1 |
| Phenol | 0.1 |
| Purified water | 63.9 |
| Total | 100.0 |

EXAMPLE 3

The following materials were treated by the same procedure as in Example 1 to prepare a black aqueous pigment ink for ball point pens. The viscosity of the ink was 3.6 mPa.s.

| | |
|---|---|
| Carbon black | 8.0 (wt %) |
| (trade name "Carbon Black MA-100", made by MITSUBISHI KASEI CORPORATION) | |
| Glycerin | 20.0 |
| Ammonium salt of styrene-acrylic acid resin | 3.0 |
| Triethanolamine | 0.5 |
| 2,5-dimercapto-1,3,4-thiadiazole | 1.0 |
| Benztriazole | 0.1 |
| Phenol | 0.1 |
| Styrene-acrylic acid copolymer emulsion | 3.0 |
| Purified water | 64.3 |
| Total | 100.0 |

EXAMPLE 4

The following materials were treated by the same procedure as in Example 1 to prepare a black aqueous pigment ink for ball point pens. The viscosity of the ink was 3.6 mPa.s.

| | |
|---|---|
| Carbon black | 8.0 (wt %) |
| (trade name "Carbon Black MA-100", made by MITSUBISHI KASEI CORPORATION) | |
| Glycerin | 10.0 |
| Ammonium salt of styrene-acrylic acid resin | 3.0 |
| Aminomethylpropanol | 0.5 |
| 2,5-dimercapto-1,3,4-thiadiazole | 0.3 |
| 1,2-benzisothiazoline-3-one | 0.1 |
| Purified water | 78.1 |
| Total | 100.0 |

EXAMPLE 5

The following materials were used to prepare a black aqueous dye ink for ball point pens. The viscosity of the ink was 2.8 mPa.s.

That is to say, the respective materials were stirred at 40 to 60° C. for 1 hour, cooled, and then filtered to obtain the ink.

| | |
|---|---|
| Black dye | 5.0 (wt %) |
| Ethylene glycol | 15.0 |
| 2,5-dimercapto-1,3,4-thiadiazole | 0.3 |
| Triethanolamine | 0.5 |
| Sodium salt of 2-pyridinethiol-1-oxide | 0.1 |
| Benztriazole | 0.2 |
| Purified water | 78.9 |
| Total | 100.0 |

EXAMPLE 6

The following materials were used at room temperature to prepare a red aqueous dye ink for ball point pens. The viscosity of the ink was 100 mPa.s.

| | |
|---|---|
| Red dye (C.I. Acid Red 87) | 5.0 (wt %) |
| Ethylene glycol | 15.0 |
| Triethanolamine | 0.5 |
| 2,5-dimercapto-1,3,4-thiadiazole | 0.3 |
| 1,2-benzisothiazoline-3-one | 0.1 |
| Xanthane gum | 0.3 |
| Purified water | 78.8 |
| Total | 100.0 |

EXAMPLE 7

The following materials were used to prepare a black aqueous pigment ink for ball point pens. The viscosity of the ink was 120 mPa.s.

That is to say, all the materials except polysodium acrylate were stirred and mixed for 3 hours by a stirrer, and then dispersed for 5 hours by a sand mill. Next, coarse particles were removed from the mixture by a centrifugal separator, and polysodium acrylate was then slowly added while the mixture was stirred at room temperature. Afterward, the mixture was further stirred for 3 to 4 hours, and then filtered to obtain the ink.

| | |
|---|---|
| Carbon black | 8.0 (wt %) |
| (trade name "Carbon Black MA-100", made by MITSUBISHI KASEI CORPORATION) | |
| Glycerin | 10.0 |
| Ammonium salt of styrene-acrylic acid resin | 3.0 |
| 2,5-dimercapto-1,3,4-thiadiazole | 0.3 |
| 1,2-benzisothiazoline-3-one | 0.1 |
| Polysodium acrylate | 0.5 |
| Purified water | 77.6 |
| Total | 100.0 |

COMPARATIVE EXAMPLE 1

The same procedure as in Example 1 was repeated except that 2,5-dimercapto-1,3,4-thiadiazole was not used and 0.5% by weight of triethanolamine and 67.8% by weight of purified water were used, thereby obtaining a black aqueous pigment ink. The viscosity of the ink was 3.7 mPa.s.

COMPARATIVE EXAMPLE 2

The same procedure as in Example 2 was repeated except that 2,5-dimercapto-1,3,4-thiadiazole was not used and purified water was used in an amount of 64.0% by weight, thereby obtaining a blue aqueous pigment ink. The viscosity of the ink was 3.9 mPa.s.

COMPARATIVE EXAMPLE 3

The same procedure as in Example 1 was repeated except that 2,5-dimercapto-1,3,4-thiadiazole was not used but 1% by weight of potassium oleate, 0.3% of triethanolamine and 67.0% by weight of purified water were used, thereby obtaining a black aqueous pigment ink. The viscosity of the ink was 3.5 mPa.s.

COMPARATIVE EXAMPLE 4

The same procedure as in Example 5 was repeated except that 2,5-dimercapto-1,3,4-thiadiazole was not used and purified water was used in an amount of 79.2% by weight, thereby obtaining a black aqueous dye ink. The viscosity of the ink was 2.7 mPa.s.

COMPARATIVE EXAMPLE 5

The same procedure as in Example 6 was repeated except that 2,5-dimercapto-1,3,4-thiadiazole was not used and purified water was used in an amount of 79.1% by weight, thereby obtaining a red aqueous dye ink. The viscosity of the ink was 90 mPa.s.

COMPARATIVE EXAMPLE 6

The same procedure as in Example 7 was repeated except that 2,5-dimercapto-1,3,4-thiadiazole was not used and purified water was used in an amount of 77.9% by weight, thereby obtaining a black aqueous dye ink. The viscosity of the ink was 100 mPa.s.

By the use of ball point pens using the inks obtained in Examples 1 to 7 and Comparative Examples 1 to 6, a writing test was carried out to inspect ball sinkage, a writing feeling and the feathering state of a written line. The results are shown in Table 1.

TABLE 1

| | Writing Test | | | |
|---|---|---|---|---|
| | Ball Point Pen | Ball Sinkage ($\mu$m) | Writing Feeling | Feathering of Written Line |
| Example 1 | Ink Absorber Type | 12 | o | o |
| Comp. Ex. 1 | " | 20 | Δ | o |
| Example 2 | Direct Storage Type | 7 | o | o |
| Comp. Ex. 2 | " | 15 | Δ | o |
| Comp. Ex. 3 | Ink Absorber Type | 15 | o | x |
| Example 3 | Ink Absorber Type | 11 | o | o |
| Example 4 | " | 12 | o | o |
| Example 5 | Direct Storage Type | 5 | o | o |
| Comp. Ex. 4 | " | 10 | Δ | o |
| Example 6 | Direct Storage Type | 10 | o | o |
| Comp. Ex. 5 | " | 18 | Δ | o |
| Example 7 | Direct Storage Type | 10 | o | o |
| Comp. Ex. 6 | " | 22 | Δ | o |

As is apparent from the results in Table 1, according to the aqueous inks of the present invention, the ball sinkage can be controlled, the writing feeling is smooth, and the feathering of the written line can be inhibited.

What is claimed is:

1. An aqueous ink composition for ball point pens which comprises 0.01 to 10% by weight of 2,5-dimercapto-1,3,4-thiadiazole or its salt based on the total weight of the composition, a colorant, water and a water-soluble organic solvent.

2. The aqueous ink composition for ball point pens according to claim 1 wherein the amount of 2,5-dimercapto-1,3,4-thiadiazole or its salt is in the range of 0.1 to 5% by weight based on the total weight of the composition.

3. The aqueous ink composition for ball point pens according to claim 1 wherein the amount of said colorant is 0.05 to 30% by weight, wherein the amount of water is 40 to 90% by weight and wherein the amount of water-soluble organic solvent is 40% or less by weight with respect to the total amount of the composition.

4. An aqueous ink composition for ball point pens which comprises 0.01 to 10% by weight of 2,5-dimercapto-1,3,4-thiadiazole or its salt based on the total weight of the composition, a pigment, a dispersant, water, and a water-soluble organic solvent.

5. The aqueous ink composition for ball point pens according to claim 4 wherein the amount of said pigment is 2 to 30% by weight, wherein the amount of said dispersant is 0.1 to 10% by weight, wherein the amount of said water is 40 to 90% by weight and wherein the amount of said water-soluble organic solvent is 40% or less by weight with respect to the total amount of the composition.

6. The aqueous ink composition for ball point pens according to claim 4 wherein the dispersant is a water-soluble polymer.

7. An aqueous ink composition for ball point pens which comprises 0.01 to 10% by weight of 2,5-dimercapto-1,3,4-thiadiazole or its salt, 0.05 to 30% by weight of a dye, 40 to 90% by weight of water and 40% by weight or less of a water-soluble organic solvent.

8. The aqueous ink composition for ball point pens according to claim 5 wherein the dispersant is a water soluble polymer.

* * * * *